Jan. 16, 1968  Y. J. TALBOT  3,363,872
REAR VIEW MIRROR
Filed Oct. 4, 1965
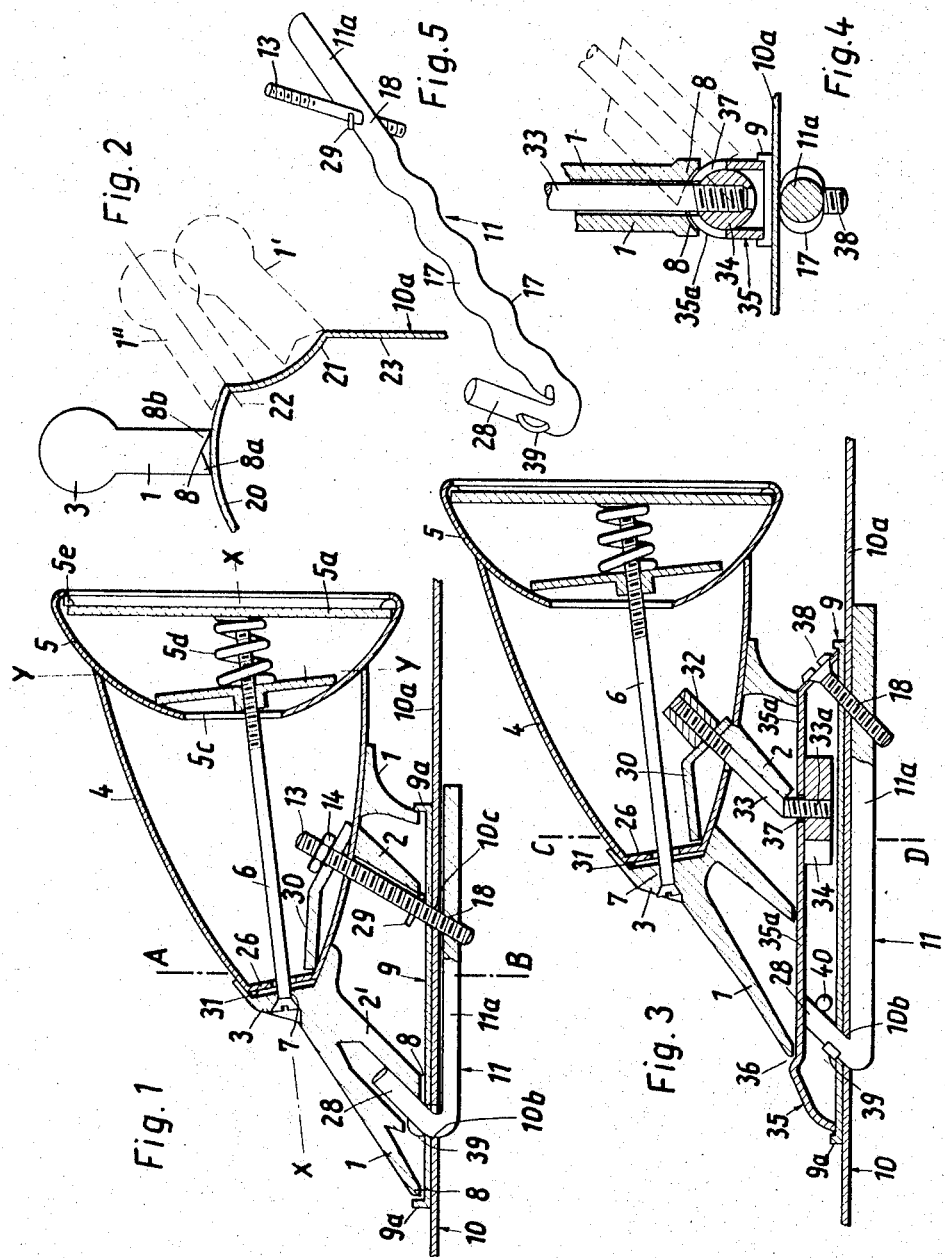
Inventor:
Yorck J. Talbot
by
Michael S. Striker
Atty United States Patent Office 3,363,872
Patented Jan. 16, 1968

3,363,872
REAR VIEW MIRROR
Yorck Joachim Talbot, 7 Ballenstaedterstrasse, Berlin-Wilmersdorf, Germany
Filed Oct. 4, 1965, Ser. No. 492,569
Claims priority, application Germany, July 27, 1965,
A 6,905
20 Claims. (Cl. 248—483)

ABSTRACT OF THE DISCLOSURE

In an automotive vehicle, a body including a panel having an inner side and an outer side; and a rear view mirror including a foot adjacent to the outer side of the panel and having a rearwardly open socket, a hollow housing having a front end portion received in the socket, a mirror head adjustably mounted in the housing, and coupling means securing the foot to the panel, the foot and the housing each having an outer face which slopes gradually rearwardly and outwardly away from the outer side of the panel.

---

The present invention relates to rear view mirrors in general, and more particularly to improvements in rear view mirrors of the type disclosed in my copending applications Ser. Nos. 179,936 (now U.S. Patent 3,214,578), 356,253, 356,259 (now U.S. Patent 3,265,878), 367,471, 383,571 (now U.S. Patent 3,279,735), and 416,565 (now U.S. Patent 3,283,654). Still more particularly, the invention relates to a novel device for coupling a rear view mirror to the body of an automotive vehicle.

It is an important object of the invention to provide a rear view mirror which can be readily mounted at the outer side of a convex, concave, beaded, ridged or flat panel and to construct the component parts of the mirror in such a way that the manipulation of a single nut, bolt, screw or similar threaded element suffices to properly hold and lock all such parts which are to be directly or indirectly fastened to the body of the automotive vehicle.

Another object of the invention is to provide a novel fastener which may be used in a coupling device for the rear view mirror of the above outlined characteristics.

A further object of the invention is to provide a novel one-piece or composite main supporting member or foot which forms part of the improved rear view mirror and is capable of being adjustably and detachably coupled to a panel of the vehicle body in such a way that it is automatically wedged or locked in requisite position in response to the application of a single threaded element.

An additional object of the invention is to provide a rear view mirror which can be attached to a new vehicle body directly in the manufacturing plant or to the body of a used vehicle.

A concomitant object of the invention is to provide a rear view mirror which is of eye-pleasing appearance and is free of undesirable protuberances, sharp corners, edges or similar unevennesses which are hard to clean and are likely to affect the streamlined shape of the mirror.

Another object of the invention is to provide a mirror wherein the positoin of the reflecting surface may be adjusted in all directions, by resorting to readily available tools and without necessitating even partial dismantling of the mirror.

Still another object of the invention is to provide a rear view mirror which is of very simple and compact design, which can be installed on all types of automotive vehicles, whose rigid parts may be safely mounted on a vehicle body without scratching the external surface of the paneling, and which can be adjusted or mounted not only by a trained mechanic but also by a person having little technical skill.

Briefly stated, one feature of my present invention resides in the provision of a rear view mirror which is mounted on and in the body of an automotive vehicle having a panel consisting of sheet metal or the like. The rear view mirror includes a one-piece or composite foot which is adjacent to the outer side of the panel and is formed with a rearwardly open socket, a hollow housing having a front end portion or tip which extends into the cavity of the socket, a mirror head adjustably mounted in the open rear end of the housing, and coupling means securing the foot to the panel, preferably in such a way that the tip of the housing is automatically urged into the cavity of the socket.

The coupling means preferably comprises a fastener having an elongated first portion or shank which is adjacent to the innr eside of the panel and a hooked second portion which extends through an aperture of the panel and into the interior of the foot to engage a transversely extending stiffener of the foot. The two portions of the fastener enclose an acute angle and the coupling means further comprises a bolt or an analogous threaded fastener which is mounted in the foot and extends through a second aperture of the panel and into a tapped bore provided in the shank of the fastener. The connection between the bolt and the foot may further comprise a nut which biases the foot against the outer side of the panel (preferably against an elastic packing plate which is inserted between the foot and the outer side of the panel), and the inclination of the bolt with reference to the shank of the fastener is preferably such that, when the nut or bolt is tightened, the stiffener is automatically wedged between the hooked portion of the fastener and the outer side of the panel.

A further advantageous feature of the invention resides in such configuration of the inner side of the foot that the latter may be mounted on a flat, convex, concave or ridged portion of the panel. Also, the foot may comprise two sections including an outer section which carries the housing and an inner section or base which is coupled to the panel of the vehicle body. The outer section may be made to swivel with reference to the base to thereby select the inclination of the mirror head with reference to a horizontal plane.

The novel features which are considered as characteristic of the invention are set forth in particular in the appended claims. The improved rear view mirror itself, however, both as to its construction and the mode of assembling and mounting the same, together with additional features and advantages thereof, will be best understood upon perusal of the following detailed description of certain specific embodiments with reference to the accompanying drawings, in which:

FIG. 1 is a longitudinal central section through a rear view mirror which is constructed and assembled in accordance with a first embodiment of my invention;

FIG. 2 is a diagrammatic transverse sectional view substantially as seen from the line A–B of FIG. 1 and illustrates the foot of the rear view mirror in three different positions;

FIG. 3 is a longitudinal section through a modified rear view mirror;

FIG. 4 is a transverse section as seen from the line C–D of FIG. 3; and

FIG. 5 is an enlarged perspective view of a fastener which may be used in the mirror of FIGS. 1–2 or 3–4.

Referring first to FIG. 1, the rear view mirror therein shown comprises a hollow plastic or metallic casting 1 which constitutes a foot and is provided with inclined transversely extending internal stiffeners or ribs 2, 2'. That portion of the foot 1 which is distant from the vehicle body 10 is provided with a socket 3 having a through bore 7 and a rearwardly open recess or cavity 31 which communicates with the bore 7. The cavity 31 receives the flattened front end portion or tip 26 of a hollow conical housing 4. The axis X—X of the housing 4 is slightly inclined with reference to the body 10. However, and in order to make sure that the plane Y—Y of the open rear (larger-diameter) end of the housing 4 is located in a plane which is normal to the plane of the adjacent portion of the body 10, the housing is cut off at a slant. This can be readily determined by observing the inclination of the axis X—X with reference to the plane Y—Y. The open rear end of the housing 4 receives a portion of a dome-shaped or cupola-shaped mirror head 5. Once the head 5 is moved to a requisite position so that the mirror glass 5a enables the driver to observe a desired area of the road behind the vehicle, the head is fixed in such position by a connecting spindle 6 which passes through the bore 7 and through an aperture in the tip 26 of the housing 4. The rear end portion of the spindle 6 is threaded to mesh with the hub of a spring retainer 5b adjacent to a large cutout 5c in the front portion of the head 5. The retainer 5b serves as a stop for the foremost convolution of a helical spring 5d which biases the marginal portion of the mirror glass 5a against an elastic sealing ring 5e inserted in the maximum-diameter rear end of the head 5. The head of the spindle 6 is retained in an enlarged portion of the bore 7 so that, when this spindle is screwed down, it couples the housing 4 to the foot 1 by urging the tip 26 into the recess 31 and it simultaneously couples the mirror head 5 to the housing 4.

The rear view mirror shown in FIG. 1 constitutes a streamlined body whose outline diverges rearwardly and away from the outer side of the vehicle body 10. The mirror begins at the forward (left-hand) end of the foot 1 and has a smooth shoulder in the region of the socket 3 to thereupon again diverge gradually toward the head 5.

The means for coupling the mirror to the body 10 comprises a fastener 11 which includes an elongated portion or shank 11a extending along the inner side of the panel 10a of the body 10. The hooked front portion 28 of the fastener 11 extends through an aperture 10b in the panel 10a and into the interior of the foot 1. The shank 11a is formed with a tapped bore 18 which registers with a second aperture 10c in the panel 10a so that it may receive a portion of a threaded member here shown as a bolt 13. The bolt 13 carries a radially extending stop pin 29 which abuts against a packing plate 9 when the bolt is properly threaded into the shank 11a of the fastener 11. The plate 9 can be considered as forming part of the panel 10a.

For mounting the rear view mirror on the vehicle body 10, the fastener 11 is inserted in the first step so that its hooked portion 28 extends outwardly through the aperture 10b and that the tapped bore 18 registers with the aperture 10c of the panel 10a. In the next step, the operator places the packing plate 9 against the outer side of the panel 10a and screws the bolt 13 into the bore 18 so that the stop 29 comes into abutment with the plate 9. In a next-following step, the operator applies the foot 1 in such a way that the hooked portion 28 enters the space between the front rib 2' and the adjacent foremost portion of the foot 1. The front rib 2' is inclined in such a way that it is wedged into the space between the hooked portion 28 and the outer side of the packing plate 9. The tip 26 of the housing 4 is then inserted into the cavity of the socket 3 and the person in charge inserts an elastic washer 30 into the housing 4 so that the washer 30 surrounds the outer end portion of the bolt 13 and bears against the inner side of the housing. By driving home a nut 14 which is threaded onto the outer end portion of the bolt 13, the operator causes the washer 30 to bear against the housing 4 and to urge the housing against the foot 1 so that the latter wedges the front rib 2' under the hooked portion 28 of the fastener 11 and is thereby held against wobbling. In other words, by the simple expedient of applying the nut 14 against the washer 30, the operator forces the tip 26 into the cavity 31 of the socket 3 and wedges the front rib 2' into the space between the hooked portion 28 and the outer side of the plate 9. At the same time, the inclined bolt 13 pulls the shank 11a of the fastener 11 against the inner side of the panel 10a and forces the foot 1 into abutment with the plate 9. The washer 30 constitutes a strong elastic bridge and prevents unintentional loosening of the nut 14. It will be noted that, when the mirror head 5 is detached from the housing 4, the nut 14 can be turned by hand or by means of a simple tool which is introduced through the open rear end of the housing. Thus, the assembly of the housing 4 with the foot 1 and fastener 11 can be carried out in a very simple manner, merely by tightening the nut 14. The rear rib 2 serves to further strengthen the foot 1 in the region where the foot is coupled with the inclined bolt 13.

That surface of the foot 1 which abuts against the outer side of the packing plate 9 preferably resembles an elongated rectangle and is formed with a longitudinally extending V-shaped or concave groove 8 (see particularly FIG. 2). Thus, the foot 1 will abut against a flat surface solely along two elongated marginal portions 8a, 8b shown in FIG. 2. These marginal portions 8a, 8b are parallel to each other. The packing plate 9 is preferably formed with a pair of lips 9a which seal the respective ends of the groove 8. The main purpose of the plate 9 is to prevent scratching of the panel 10a by the marginal portions 8a, 8b of the foot 1, and this plate preferably consists of elastically deformable material.

Once the housing 4 is properly attached to the foot 1, the operator inserts the head 5 into the open rear end of the housing and applies the spindle 6 to thereby fix the head 5 in desired position. The head may swivel in all directions upon loosening of the spindle 6. If desired, the open end of the housing 4 may be lined with a gasket of elastic material to prevent scratching of the convex outer side of the head 5.

FIG. 2 illustrates the manner in which the foot 1 may be mounted on differently configured portions of a panel 10a. In the solid line position of the foot 1, its marginal portions 8a, 8b abut against a convex portion 20 of the panel 10a. Thus, the surfaces surrounding the groove 8 remain spaced from the outer side of the panel portion 20. The packing plate 9 has been omitted for the sake of clarity.

In the broken-line position 1' of the foot 1, the marginal portions 8a, 8b abut against a concave portion 21 of the panel 10a. In the phantom-line position 1" of the foot 1, the groove 8 receives an elongated ridge 22 of the panel 10a so that the marginal portions 8a, 8b may remain out of contact with the outer side of the panel. It is clear that the foot 1 may be mounted on a flat portion 23 of the panel 10a. Since the packing plate 9 preferably consists of flexible elastic material, it can readily follow the outline of the portion 20, 21, 22 or 23 of the panel 10a shown in FIG. 2. Also, the hooked portion 28 of the fastener 11 (not shown in FIG. 2) can readily extend through an aperture provided in either one of the panel portions 20–23. The shank 11a of the fastener 11 can be made to abut against a concave, convex, flat, V-shaped or otherwise configured internal surface of the panel 10a. At the very worst, and assuming that the shank 11a is received in the ridge 22 shown in FIG. 2, the fastener 11 will be held in a three-point contact with the inner side of the panel 10a.

In FIG. 3, the rear view mirror comprises a composite foot including an outer section 1 which is identical or nearly identical with the foot 1 of FIG. 1, and a hollow inner section or base 35. The base 35 is inserted between the outer section 1 and the packing plate 9. The base 35 has an elongated convex portion 35a of semicircular outline which is straddled by the section 1 in such a way that, if necessary, the section 1 may be tilted or swiveled to either side of its central or neutral position shown in FIG. 4. The bolt 13 is replaced by a bolt 33 having an inclined inner end portion 33a which meshes with a nut 34 accommodated in the base 35, i.e., at the outer side of the packing plate 9. The end portion 33a extends through a transverse slot 37 in the convex portion 35a of the base 35. The nut 34 resembles a cylinder (see FIG. 4) so that it cannot rotate in the base 35.

The outer end portion of the bolt 33 extends into the housing 4 and meshes with a nut 32 which bears against a strong elastic washer or bridge 30 so that the bolt 33 serves as a connector between the parts 1, 35 and 4. The nut 32 is readily accessible if the mirror head 5 is detached in response to removal of the spindle 6. When the nut 32 is rotated in a sense to deform the washer 30, the front end portion of the section 1 slides forwardly and ultimately abuts against a stop shoulder 36 of the base 35. At such time, the tip 26 of the housing 4 already extends into the socket 3 with such a force that the housing is held against any wobbling or rattling. However, the section 1 can be forcibly tilted with reference to the convex portion 35a of the base 35 because the bolt 33 extends through the elongated transverse slot 37 and because the nut 34 resembles a cylindrical body. The phantom lines indicate in FIG. 4 a tilted position of the section 1 and bolt 33.

The fastener 11 of FIGS. 3 and 4 serves to couple the panel 10a with the base 35 in that its hooked portion 28 extends through the aperture 10b of the panel 10a, through a registering aperture in the plate 9, and into the interior of the base 35. The base comprises a stiffener pin 40 which is wedged under the hooked portion 28 when the operator tightens a second bolt or screw 38 which may be driven into the bore 18 of the shank 11a. The screw or bolt 38 is inserted through an aperture provided at the rear end of the base 35.

FIG. 5 shows that the shank 11a of the fastener 11 may be provided with undulations 17 so that it resembles a crank shaft. The undulations 17 are preferably disposed in a common plane (see FIG. 4) to make sure that the shank 11a cannot turn when it abuts against the inner side of the panel 10a.

Of course, if the fastener 11 of FIG. 5 is used in the rear view mirror of FIGS. 3 and 4, the bolt 13 shown in FIG. 5 is replaced by the bolt or screw 38. The fastener 11 may consist of round metallic stock of relatively small diameter. The undulations 17 constitute a very simple means for enlarging the area of contact between the shank 11a and the internal surface of the panel 10a, and such undulations also prevent undesirable turning of the fastener. Furthermore, the undulate shank 11a can be readily introduced through an aperture 10b whose diameter need not exceed the diameter of the fastener 11.

The hooked portion 28 carries a protuberance or nose 39 which prevents the hooked portion from falling into the interior of the vehicle body 10 during assembling of the rear view mirror. Thus, even if the mechanic is careless, he simply cannot cause or allow the hooked portion 28 to pass through the aperture 10b. The mirror may be installed on the outer panel of that door which is adjacent to the driver's seat in an automotive vehicle.

It is clear, however, that the fastener 11 may be formed as a body of polygonal cross-sectional outline so that the undulations 17 may be dispensed with.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In an automotive vehicle, a body including a panel having an inner side and an outer side; and a rear view mirror including a foot having a rearwardly open socket and an elongated inner planar surface of rectangular outline adjacent to the outer side of said panel, said surface having two spaced parallel marginal portions of substantially equal length and being provided with a longitudinally extending groove intermediate said marginal portions paralleling the same so that only said marginal portions bear against said panel, a hollow housing having a front end portion received in said socket, a mirror head adjustably mounted in said housing, and coupling means securing said foot to said panel, said foot and said housing each having an outer face which slopes gradually rearwardly and outwardly away from said outer side of said panel.

2. A structure as set forth in claim 1, wherein said foot is hollow and is provided with transversely extending internal stiffener means.

3. A structure as set forth in claim 1, wherein said panel comprises a flat portion which is adjacent to the marginal portions of said foot.

4. A structure as set forth in claim 1, wherein said panel comprises a concave portion which is adjacent to said marginal portions.

5. A structure as set forth in claim 1, wherein said panel comprises a convex portion which is adjacent to said marginal portions.

6. A structure as set forth in claim 1, wherein said panel comprises an elongated ridge which extends into said groove.

7. A structure as set forth in claim 1, wherein said socket is provided with a rearwardly open cavity and with a bore communicating with said cavity, said housing resembling a hollow cone whose tip constitutes said front end portion thereof and extends into said cavity, and further comprising an elongated spindle extending through said bore of the socket, through the tip of said housing and having a rear portion arranged to secure said mirror head to said housing.

8. A structure as set forth in claim 7, wherein the axis of said housing is inclined rearwardly and outwardly with reference to the outer side of said panel and wherein said housing comprises an open rear end receiving a portion of said head and located in a plane which is substantially normal to said panel.

9. A structure as set forth in claim 1, wherein said coupling means comprises a fastener having an elongated shank adjacent to the inner side of said panel and a hooked portion rigid with said shank and extending through an aperture provided in said panel and into the interior of said foot, and a threaded member mounted in said foot and extending through a second aperture provided in said panel and into a tapped bore provided in said shank.

10. A structure as set forth in claim 9, wherein said shank is provided with coplanar undulations abutting against the inner side of said panel.

11. A structure as set forth in claim 9, wherein the hooked portion of said fastener comprises a protuberance which prevents the hooked portion from passing through the respective aperture and to the inner side of said panel.

12. A structure as set forth in claim 1, wherein said foot and said housing together form a streamlined structure which is free of pronounced projections and wherein the exterior said socket forms a smooth transition from the remainder of said foot to the exterior of said housing.

13. In automotive vehicle, a body including a panel having an inner side and an outer side and provided with a pair of apertures; and a rear view mirror including a foot adjacent to the outer side of said panel and having a rearwardly open socket, a hollow housing having a front end portion received in said socket, a mirror head adjustably mounted in said housing, and coupling means securing said foot to said panel, said coupling means comprising a fastener having a first portion adjacent to the inner side of said panel and a second portion extending through one of said apertures and into said foot, a stiffener provided in said foot and abutting against the second portion of said fastener, a threaded member extending through the other of said apertures and into a tapped bore provided in the first portion of said fastener, and a nut meshing with said threaded member and arranged to urge said foot against the outer side of said panel.

14. A structure as defined in claim 13, wherein said foot comprises a base which is adjacent to the outer side of said panel, and an outer section carried by said base and tiltable with reference thereto.

15. A structure as set forth in claim 13, wherein the first and second portions of said fastener enclose an acute angle and wherein the inclination of said threaded member is such that, in response to tightening of said nut, the stiffener is wedged between the second portion of said fastener and the outer side of said panel.

16. A structure as set forth in claim 15, further comprising an elastic washer interposed between said nut and said foot.

17. A structure as set forth in claim 15, wherein said threaded member extends through and into the interior of said housing and said nut is provided in the housing so as to urge the housing against said foot.

18. A structure as set forth in claim 17, wherein the inclination of said threaded member is such that, in response to tightening of said nut, the front end portion of the housing is automatically urged into said socket.

19. In an automotive vehicle, a body including a panel having an inner side and an outer side and provided with a first and second aperture; and a rear view mirror including a foot adjacent to the outer side of said panel and having a rearwardly open socket, said foot comprising an outer section and a base which is adjacent to the outer side of said panel, said base having an elongated portion of substantially semi-circular cross-sectional outline and said outer section having an inner side provided with an elongated groove which receives the elongated portion of said base in such a way that the outer section may be tilted with reference to said elongated portion, connecting means for connecting said outer section to said base and including a substantially cylindrical nut provided in said base and a bolt mounted in said outer section and meshing with said nut, said bolt extending through a transverse slot provided in the elongated portion of said base, a hollow housing having a front end portion received in said socket of said foot, a mirror head adjustably mounted in said housing, and coupling means securing said foot to said panel and comprising a fastener having a first portion adjacent to the inner side of said panel and a second portion extending through said first aperture of said panel and into said base, a stiffener provided in said base and engaging the second portion of said fastener, and a bolt extending through said second aperture of said panel and into a tapped bore provided in the first portion of said fastener, the inclination of said bolt with reference to said base being such that, when the bolt is tightened, the stiffener is caused to bear against the second portion of said fastener.

20. A structure as set forth in claim 19, wherein said base is provided with stop means and wherein said outer section comprises a front portion which abuts against said stop means to thus locate the outer section on the base.

References Cited

UNITED STATES PATENTS

| | | | |
|---|---|---|---|
| 1,578,634 | 3/1926 | Borgmann | 248—299 |
| 2,098,997 | 11/1937 | Bramming | 248—205 |
| 2,364,165 | 12/1944 | Sarnes | 88—98 |
| 2,844,999 | 7/1958 | Wendela | 88—98 X |
| 3,096,664 | 7/1963 | Walsh | 88—98 X |
| 3,149,812 | 9/1964 | Fuqua | 88—98 X |
| 3,283,607 | 11/1966 | Van Noord | 248—226 X |

FOREIGN PATENTS

| | | |
|---|---|---|
| 1,332,047 | 6/1963 | France. |
| 944,254 | 12/1963 | Great Britain. |

ROY D. FRAZIER, *Primary Examiner.*

CHANCELLOR E. HARRIS, CLAUDE A. LE ROY, *Examiners.*

R. P. SEITTER, *Assistant Examiner.*

UNITED STATES PATENT OFFICE
CERTIFICATE OF CORRECTION

Patent No. 3,363,872 January 16, 1968

Yorck Joachim Talbot

It is certified that error appears in the above identified patent and that said Letters Patent are hereby corrected as shown below:

In the heading to the printed specification, line 6, "Germany" should read -- Austria --.

Signed and sealed this 10th day of March 1970.

(SEAL)
Attest:

Edward M. Fletcher, Jr.
Attesting Officer

WILLIAM E. SCHUYLER, JR.
Commissioner of Patents